: (12) United States Patent
Kind et al.

(10) Patent No.: US 7,326,376 B1
(45) Date of Patent: Feb. 5, 2008

(54) METHOD AND DEVICE FOR CONTROLLING THE COMPOSITION OF THE CELLULOSE CONTAINING EXTRUSION SOLUTION IN THE LYOCELL PROCESS

(75) Inventors: Uwe Kind, Rudolstadt (DE); Leo Kagalowski, Frankfurt (DE); Marco Blech, Mainz-Kastel (DE)

(73) Assignee: Lenzing AG (AT)

( * ) Notice: Subject to any disclaimer, the term of this patent is extended or adjusted under 35 U.S.C. 154(b) by 251 days.

(21) Appl. No.: 10/110,149

(22) PCT Filed: Sep. 29, 2000

(86) PCT No.: PCT/DE00/03454

§ 371 (c)(1),
(2), (4) Date: Oct. 17, 2002

(87) PCT Pub. No.: WO01/25517

PCT Pub. Date: Apr. 12, 2001

(30) Foreign Application Priority Data

Oct. 6, 1999 (DE) ................................ 199 47 909

(51) Int. Cl.
B29C 47/78 (2006.01)
B29C 47/92 (2006.01)
D01D 1/02 (2006.01)
D01D 5/06 (2006.01)
D01D 10/06 (2006.01)
D01F 2/02 (2006.01)

(52) U.S. Cl. .................... 264/40.1; 264/187; 264/203; 264/211.13; 264/211.14; 264/233

(58) Field of Classification Search ............... 264/187, 264/203, 211.14, 40.1, 211.13, 233
See application file for complete search history.

(56) References Cited

U.S. PATENT DOCUMENTS 5,266,159 A * 11/1993 Greenwood et al. .......... 162/17
5,456,748 A * 10/1995 Quigley et al. .......... 106/200.1
5,507,983 A * 4/1996 Sellars et al. .............. 264/37.2
5,582,783 A * 12/1996 Zikeli et al. ............... 264/40.4
5,603,883 A * 2/1997 Zikeli ......................... 264/187

FOREIGN PATENT DOCUMENTS

| DE | 40 32 661 A1 | 4/1992 |
| DE | 43 21 994 A1 | 1/1995 |
| DE | 44 41 468 A1 | 5/1996 |
| EP | 0700458 B1 * | 8/1998 |
| WO | WO 94/28212 | 12/1994 |
| WO | WO 96/35008 | 11/1996 |

OTHER PUBLICATIONS

Translation of EPO 0254803 (published Feb. 3, 1988).*
Derwent Abstract 76-454 96 x 24.
Derwent Abstract 76-454 96 x 24 (SU 482528, Published Dec. 11, 1975).

* cited by examiner

Primary Examiner—Leo B. Tentoni
(74) Attorney, Agent, or Firm—Vern Maine & Associates

(57) ABSTRACT

A method of regulating the composition of the cellulose-containing extrusion solution in the production of cellulosic molded articles, whereby (a) cellulose is mixed with an aqueous amine oxide solution; (b) the mixture is converted to the extrusion solution by evaporation of water in vacuo at an elevated temperature and by input of shearing energy; (c) the extrusion solution is extruded, forming the cellulosic molded article, and is coagulated in a coagulation bath, and (d) the resulting molded article is washed to remove the residual amine oxide, characterized in that in step (a) the cellulose/amine oxide ratio is kept at a predetermined level by preregulation, and the water content of the extrusion solution is kept at a predetermined level by a main regulation after leaving step (b). This method allows accurate regulation of the composition of the solution.

16 Claims, 1 Drawing Sheet

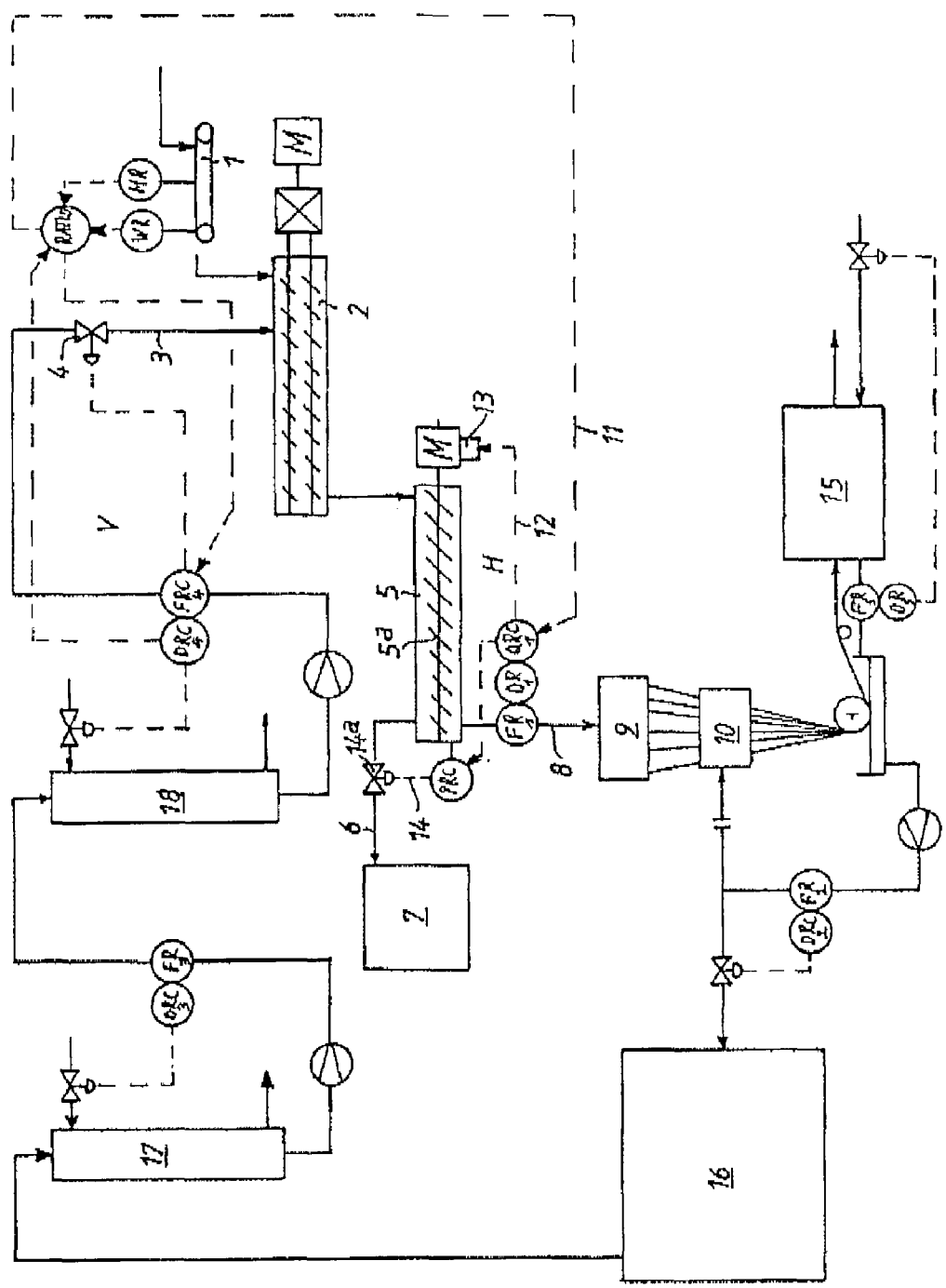

METHOD AND DEVICE FOR CONTROLLING THE COMPOSITION OF THE CELLULOSE CONTAINING EXTRUSION SOLUTION IN THE LYOCELL PROCESS

CROSS-REFERENCE TO RELATED APPLICATIONS

This application is filed under the provisions of 35 U.S.C. §371 and claims the priority of International Patent Application No. PCT/DE00/03454 filed Sep. 29, 2000, which in turn claims priority of German Patent Application No. 199 47 909.7 filed Oct. 6, 1999.

FIELD OF THE INVENTION

Background of the Invention

This invention relates to a method of regulating the composition of the cellulose-containing extrusion solution in the production of cellulosic molded articles by the lyocell process. This invention also relates to a device for regulating the composition of the cellulose-containing extrusion solution in the production of cellulosic molded articles by the lyocell process.

The properties of the cellulosic molded articles produced by the lyocell process, in particular the textile physical properties of the spun fibers and filaments, depend to a great extent on the composition of the extrusion solution (spinning solution). To achieve optimum properties, it is therefore desirable to monitor the composition of the extrusion solution and to keep fluctuations within the narrowest possible limits.

It is known from European Patent EP 700,458 B that from time to time a sample may be taken from the spinning solution entering the extrusion apparatus and its refractive index determined; the refractive index should be in the range of 1.4890 to 1.4910 at 60 °C in order to achieve satisfactory extrusion products. In addition to this discontinuous monitoring, a continuous measurement device is also provided in the line, e.g., a process refractometer. If the refractive index measured on the spinning solution is outside the range indicated, the feed to the premixer and/or the evaporator conditions should be readjusted.

DESCRIPTION OF THE INVENTION

The extrusion solution is a ternary solution of cellulose, amine oxide and water. Its composition cannot be determined accurately by measuring just one property of the spinning solution, such as the refractive index, because a plurality of different solution compositions can be correlated with a certain refractive index within the solution region of the ternary system. Therefore, the composition of the spinning solution cannot be determined accurately on the basis of a measurement of the refractive index, nor can a continuous regulating the composition be based on such a measurement. Therefore, according to European Patent B-0, 700,458, the refractive index of the extrusion solution is merely kept within a range, i.e., considerable fluctuations in composition are tolerated from the beginning. It is thus impossible to strictly regulate the composition for the purpose of achieving an optimum and uniform quality of the extrusion products.

The object of the present invention is to create a method and a device for regulating the composition of the cellulose-containing extrusion solution in the lyocell process, whereby the composition of the solution is regulated accurately, so that the composition of the solution required for optimum properties of the molded articles can be maintained and in addition, fluctuations in composition can be minimized. In particular, it should be possible to accurately determine the composition of the spinning solution continuously, so that constant readjustment of the composition of the solution may take place without any time lag, and any deviations in the composition of the extrusion solution from an ideal composition that may occur can be eliminated rapidly or kept within narrow limits. Finally, a method is to be created whereby the composition of the spinning solution can be adjusted centrally, namely in a process control system, if desired. Other advantages of the invention are derived from the following description.

The present invention is based on a method of producing cellulosic molded articles by the lyocell process in which (a) cellulose is mixed with an aqueous amine oxide solution, (b) the mixture is converted to the extrusion solution by evaporation of water in vacuo at an elevated temperature and by input of shearing energy, (c) the extrusion solution is extruded, forming the cellulosic molded article, and is coagulated in a coagulation bath, and (d) the molded article thus formed is washed to remove the residual amine oxide.

This process achieves the object of this invention by the fact that in step (a), the cellulose/amine oxide ratio is kept at a predetermined level by preregulation, and the water content of the extrusion solution after leaving step (b) is set at a predetermined level by a main regulation. Through this two-step regulation, it is possible to adjust the composition of the extrusion solution to the desired ratio in continuous operation and to minimize any fluctuations in composition that might occur, so that the required composition of the extrusion solution for optimum product properties can be maintained continuously. In contrast with the situation with the process described in European Patent B-0,700,458, the composition of the solution can be regulated accurately at the set level through the step regulation according to this invention. In preregulation, first the cellulose/amine oxide ratio desired in the extrusion solution is adjusted through the dosage of these two components. This ratio is also maintained in the solution. With this adjustment, practically the functional relationship of the density of the solution correlating with this ratio is established in the ternary system in practical terms as a function of its water content, which also describes the setpoint composition of the extrusion solution. Then through the main regulation, only the water content of the mixture coming from step (a) is adjusted to the water content of the setpoint composition of the solution by removal of water. Therefore, the core of this invention is the teaching that first the cellulose/amine oxide ratio of the setpoint composition of the extrusion solution is to be adjusted and only then is the water content of the setpoint composition adjusted in a separate step.

According to the preferred embodiment of the method according to this invention, the water content of the extrusion solution is regulated on the basis of the measurement of the density of the solution. In the regulator of the main regulation are stored the functional dependencies which indicate the water content of the extrusion solution as a function of its density for various cellulose/amine oxide ratios. The regulator of the main regulation receives the cellulose/amine oxide ratio from the regulator of the pre-regulation, so that it can perform the conversion from the measured density to the water content according to the function valid for this ratio. The density measurement on the extrusion solution is preferably performed in-line between steps (b) and (c).

According to the preferred embodiment of the method according to this invention, the water content of the extrusion solution is regulated by adjusting the water evaporation rate in step (b). The change in water evaporation rate leads directly to a corresponding change in the composition of the solution. The main regulation operates with a small dead time in comparison with a method intervening in the dosage of components in step (a). The water evaporation rate is preferably adjusted by the rate of input of the shearing energy in step (b). Given the considerable viscosity of the extrusion solution in step (b), the shearing energy is converted mainly to heat, which leads to evaporation of water in this step. In another embodiment, the water evaporation rate is adjusted through the vacuum in step (b).

The mass flow and the water content of the cellulose introduced into step (a) and the water content of the aqueous amine oxide solution introduced into step (a) is preferably measured, and the mass flow of the amine oxide solution calculated for the given cellulose/amine oxide ratio is added to step (a). On the basis of the cellulose/amine oxide ratio given for the extrusion solution, the water content of the components fed into step (a) and the measured mass flow of the cellulose, the ratio regulator regulates the required mass flow of the aqueous amine oxide solution introduced into step (a). A regulation of the ratio is performed practically in preregulation, whereby the mass flow of the amine oxide solution flowing into step (a) represents the control variable. This is the simplest means of implementing the ratio regulation. Other implementations of the ratio regulation are conceivable, e.g., by having the cellulose flow function as a control variable.

The water content of the amine oxide solution flowing into step (a) is preferably measured on the basis of its density. The water content of the amine oxide solution and/or of the cellulose can be measured in-line.

Furthermore, the wash solution(s) occurring in step (d) can be fed into the coagulation bath of step (c) and the concentration of these solution(s) can be regulated between the washing and the coagulation bath by measuring its/their density. In this way, the wash solutions are exchanged in accordance with their uptake of amine oxide.

Furthermore, with the method according to this invention, in which aqueous amine oxide solution is removed from the coagulation bath, purified, concentrated by evaporation and reintroduced into step (a), it is provided that the concentration of the solution removed from the coagulation bath may be regulated by measuring its density. In this way, the coagulation bath is sent for regeneration only after reaching a certain amine oxide content. The preferred amine oxide in the present process is N-methylmorpholine N-oxide.

The aqueous amine oxide solution is expediently concentrated from the coagulation bath by evaporating it in one or more steps, and the heating of the evaporation step(s) is regulated through in-line measurement of the density of the amine oxide solution(s) flowing out of the evaporation step(s). Thus, the amine oxide concentration of the solution at the finished concentration can be increased to the desired content for the preparation in step (a), which is then detected in the preregulation described above.

A cellulose content between 1 wt % and 15 wt % and a weight ratio of amine oxide to water between 6:1 and 15:1 is preferably maintained in the extrusion solution.

This invention is also based on a device for regulating the composition of the cellulose-containing extrusion solution in the production of cellulosic molded articles according to the lyocell process with a mixing unit with a feed mechanism for the cellulose and a feeder line for amine oxide containing water, an evaporation and dissolving unit connected downstream from the mixing unit, having at least one shearing tool connected to a rotational drive and a connected vacuum system, an extrusion apparatus connected to the evaporation and dissolving unit by a line and having a coagulation bath and at least one wash bath and a device arranged in the line for monitoring the extrusion solution.

This object is achieved with this device according to this invention by means of a preregulation circuit for regulating the cellulose/amine oxide ratio with a device arranged in the feeder line for measuring the density of the solution and the mass flow rate as a sensor and by means of a valve arranged in the feeder line as a final controlling element, and a main regulating circuit for regulating the water content of the extrusion solution in the line to the extrusion apparatus with a device arranged on it for measuring the density of the solution as a sensor and a rotational speed sensor for the rotational drive of the shearing tool and/or a pressure sensor for the vacuum system as a final controlling element. The two-step regulation according to this invention allows the formation of an extrusion solution with a precisely defined composition with a minimal range of variation. By preselecting the cellulose/amine oxide ratio and the water content of the extrusion solution in the preregulation and main regulation, the entire regulation system can be regulated centrally in a simple manner.

The density measurement instrument of the preregulation circuit is preferably also a flow rate regulator, which is connected by signal lines to a ratio regulator on the one hand and to the valve on the other hand. The ratio regulator is preferably connected to the regulator of the main circuit by a signal line. The regulator of the main regulation circuit can use the valid functional relationship between the density and the water content of the ternary extrusion solution, which is valid for the ratio signal obtained, for the density/water content conversion. The devices for measuring the density of the solution and the mass flow rate preferably operate according to the Coriolis principle. They also have an integrated temperature compensation for measurements in the range of $-10\,°C$ to $+200°\,C$.

This invention is described in greater detail below on the basis of the drawing, which shows a schematic flow chart of an installation for producing the cellulosic molded articles according to the lyocell process with the regulation according to this invention.

According to this drawing, cellulose is added continuously to a mixing apparatus 2 via a weighing apparatus 1. The moisture content of the cellulose is measured continuously in-line with the device (MR). Likewise, aqueous amine oxide solution is added to the mixing apparatus 2 through line 3 downstream from the cellulose feed. The solution flow rate is regulated on valve 4 through the flow regulator (FRC4) on the basis of the density measurement (DRC4) so that cellulose and amine oxide are in a predetermined ratio at the regulator (ratio). The mass flow of cellulose is detected at (WR), the moisture content of the cellulose is detected on the basis of the measurement (MR), and the cellulose/amine oxide ratio is also taken into account in the regulation. By preregulation in the control circuit V (i.e., (DRC4)–(ratio)–FRC4–valve 4), the mixing apparatus 2 is supplied a constant cellulose/amine oxide ratio, which is also maintained in the extrusion solution. The water content determinations by (MR) and (DRC4) in-line are necessary for regulation of the cellulose/amine oxide ratio.

The water content of the amine oxide solution is determined on the basis of the density of the solution (DRC4). In the case of (DRC4) and (FRC4) it is a single measurement device, preferably operating according to the Coriolis principle, which measures both the density and mass flow rate.

The mixture of aqueous amine oxide solution and cellulose leaving the mixing apparatus 2 is sent to the evaporation and dissolving unit 5, which is assembled with at least one rotating shearing tool 5$^a$ which is driven by the rotational drive M. As can be seen here, the dissolving unit 5 is connected by a line 6 to a vacuum system 7. The vacuum in the dissolving unit 5 can be adjusted through vacuum system 7 at a level in the range of 1 to 250 mbar, for example. The extrusion solution is formed in the evaporation and dissolving unit 5 and is then sent through the line 8 to an extrusion apparatus 9 in which the solution is spun to fibers which are coagulated after passing through an air zone in the coagulation bath 10.

The density of the solution is determined in line 8 by an in-line measurement (DR1). Functional relationships (water content as a function of density) that each are valid for one cellulose/amine oxide ratio are stored in the regulator (QRC1) of the process control system. Taking into account the setpoint water content of the composition of the solution, the required change in the control variable, which is necessary to achieve the setpoint water content and thus the setpoint composition of the solution, is calculated on the basis of the input of the cellulose/amine oxide ratio via the signal line 11 and the water content of the solution in line 8, which is determined from the density measurement (DR1). The control command goes over the signal line 12 of the main regulation circuit H to the rotational speed sensor 13 for the rotational drive M of the shearing tool 5$^a$. As an alternative or in addition, the regulator (QRC1) may also operate the vacuum sensor (PRC) and the valve 14$^a$ of the evaporation and dissolving unit 5 over the signal line 14.

The solution of the coagulation bath 10 is carried in circulation. Its water content is kept above a certain limit value by an in-line measurement of the density (DRC2) and by removal of a substream, which is regulated according to the density. The fiber bundle is sent to a fiber washing 15 in which the wash water is regulated again, as described here, and is used to dilute the coagulation bath 10. The coagulation bath thus removed goes in a regulated manner to a cleaning step 16, where it is freed of impurities. It is then concentrated in an evaporation installation 17, 18 having two steps, for example, and discharged into the line 3 leading to the mixing apparatus 2. As can be seen here, density measurement devices (DRC3) and (DRC4), which regulate the heat input in the form of water vapor to the evaporation steps, are arranged in the drain lines from the evaporation steps 17 and 18. The density of the amine oxide solution in line 3, measured by (DRC4), also serves to adjust the cellulose/amine oxide ratio and as a regulation variable for the heating of the evaporation step 18.

The invention claimed is:

1. A method of regulating a composition of a cellulose-containing extrusion solution with a pre- and main-regulation step for the production of cellulosic molded articles, comprising:
   (a) regulating the mass flow of an aqueous cellulose into a mixing vessel, wherein the mass flow is measured with a device using the Coriolis measuring principle and wherein the water content of the aqueous cellulose is known or determined;
   (b) regulating the mass flow of an aqueous amine oxide solution into a mixing vessel, wherein the mass flow is measured with a device using the Coriolis measuring principle and wherein the water content of the aqueous amine oxide solution is known or determined;
   (c) producing an aqueous cellulose/amine oxide mixture with a preselected cellulose/amine oxide ratio in the mixing vessel by regulating the mass flow of the aqueous amine oxide solution relative to the mass flow of cellulose;
   (d) converting the aqueous cellulose/amine oxide mixture to the cellulose-containing extrusion solution by evaporation of water in vacuo at an elevated temperature and by input of shearing energy to regulate the water content to a predetermined level and to maintain a constant cellulose/amine oxide ratio;
   (e) extruding the cellulose-containing extrusion solution to form the cellulosic molded article;
   (f) coagulating the cellulosic molded article in a coagulation bath; and
   (g) washing the cellulosic molded article to remove the residual amine oxide.

2. The method according to claim 1, wherein the water content of the cellulose-containing extrusion solution is regulated on the basis of a density measurement of the extrusion solution and adjusted against the predetermined level.

3. The method according to claim 2, wherein the density measurement of the cellulose-containing extrusion solution is performed in-line between steps (d) and (e).

4. The method according to claim 2, wherein the water content of the cellulose-containing extrusion solution is kept at the predetermined level by adjusting the water evaporation rate in step (d).

5. The method according to claim 4, wherein the water evaporation rate is adjusted through the rate of input of shearing energy in step (d).

6. The method according to claim 4 wherein the water evaporation rate is adjusted through the vacuum in step (d).

7. The method according to claim 1, wherein the water content of the amine oxide solution and the cellulose are measured in-line.

8. The method according to claim 1, wherein the wash solution(s) occurring in step (g) is/are introduced into the coagulation bath in step (f) and the concentration(s) of these solutions is/are regulated by measuring their density between the washing and the coagulation bath.

9. The method according to claim 1, wherein the aqueous amine oxide solution is removed from the coagulation bath, purified, concentrated by evaporation and returned to step (b), wherein the mass flow of the aqueous amine oxide solution removed from the coagulation bath is regulated by measurement of its density.

10. The method according to claim 9, wherein the aqueous amine oxide solution is concentrated by one or multi-step evaporation, and the heating of the evaporation step(s) is regulated through in-line measurement(s) of the density of the amine oxide solution(s) discharged from the evaporation step(s).

11. The method according to claim 1, wherein a cellulose content between 1 wt % and 15 wt % and a weight ratio of amine oxide to water between 6:1 and 15:1 are maintained in the extrusion solution.

12. A method of regulating a composition of a cellulose-containing extrusion solution with a pre- and main-regulation step for the production of cellulosic molded articles, comprising:

(a) regulating the mass flow of an aqueous cellulose into a mixing vessel, wherein the water content of the aqueous cellulose is known or determined;

(b) regulating the mass flow of an aqueous amine oxide solution into a mixing vessel, wherein the water content of the aqueous amine oxide solution is known or determined;

(c) producing an aqueous cellulose/amine oxide mixture with a preselected cellulose/amine oxide ratio in the mixing vessel by regulating the mass flow of the aqueous amine oxide solution relative to the mass flow of cellulose;

(d) converting the aqueous cellulose/amine oxide mixture to the cellulose-containing extrusion solution by evaporation of water in vacuo at an elevated temperature and by input of shearing energy to regulate the water content to a predetermined level and to maintain a constant cellulose/amine oxide ratio;

(e) extruding the cellulose-containing extrusion solution to form the cellulosic molded article;

(f) coagulating the cellulosic molded article in a coagulation bath; and (g) washing the cellulosic molded article to remove the residual amine oxide.

13. The method according to claim 1, wherein the water content of the aqueous cellulose is determined on the basis of a density measurement of the aqueous cellulose.

14. The method according to claim 13, wherein the density is measured with a device using the Coriolis measuring principle.

15. The method according to claim 1, wherein the water content of the aqueous amine oxide solution is determined on the basis of a density measurement of the aqueous amine oxide solution.

16. The method according to claim 15, wherein the density is measured with a device using the Coriolis measuring principle.

* * * * *